United States Patent Office 3,140,276
Patented July 7, 1964

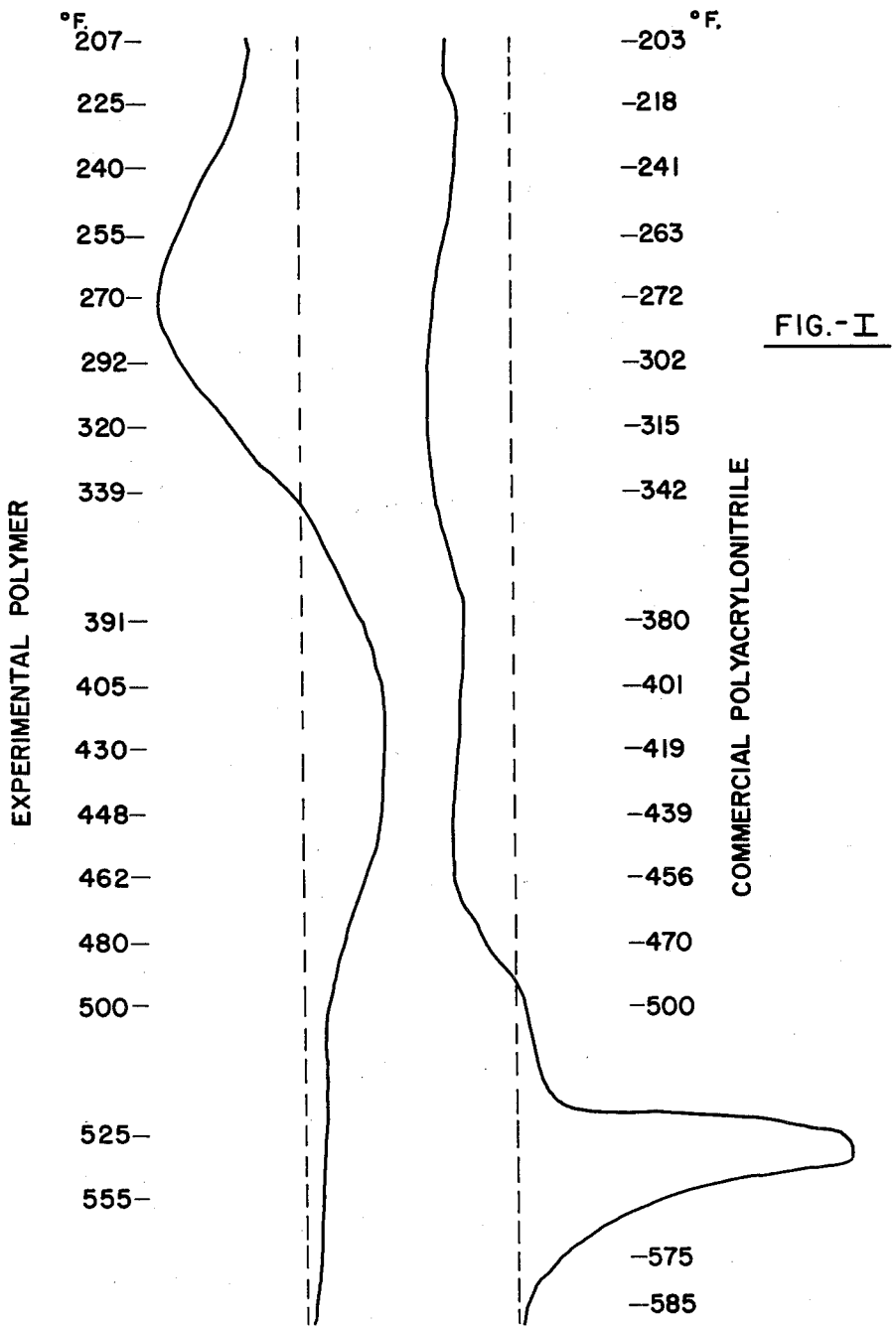
FIG.-I

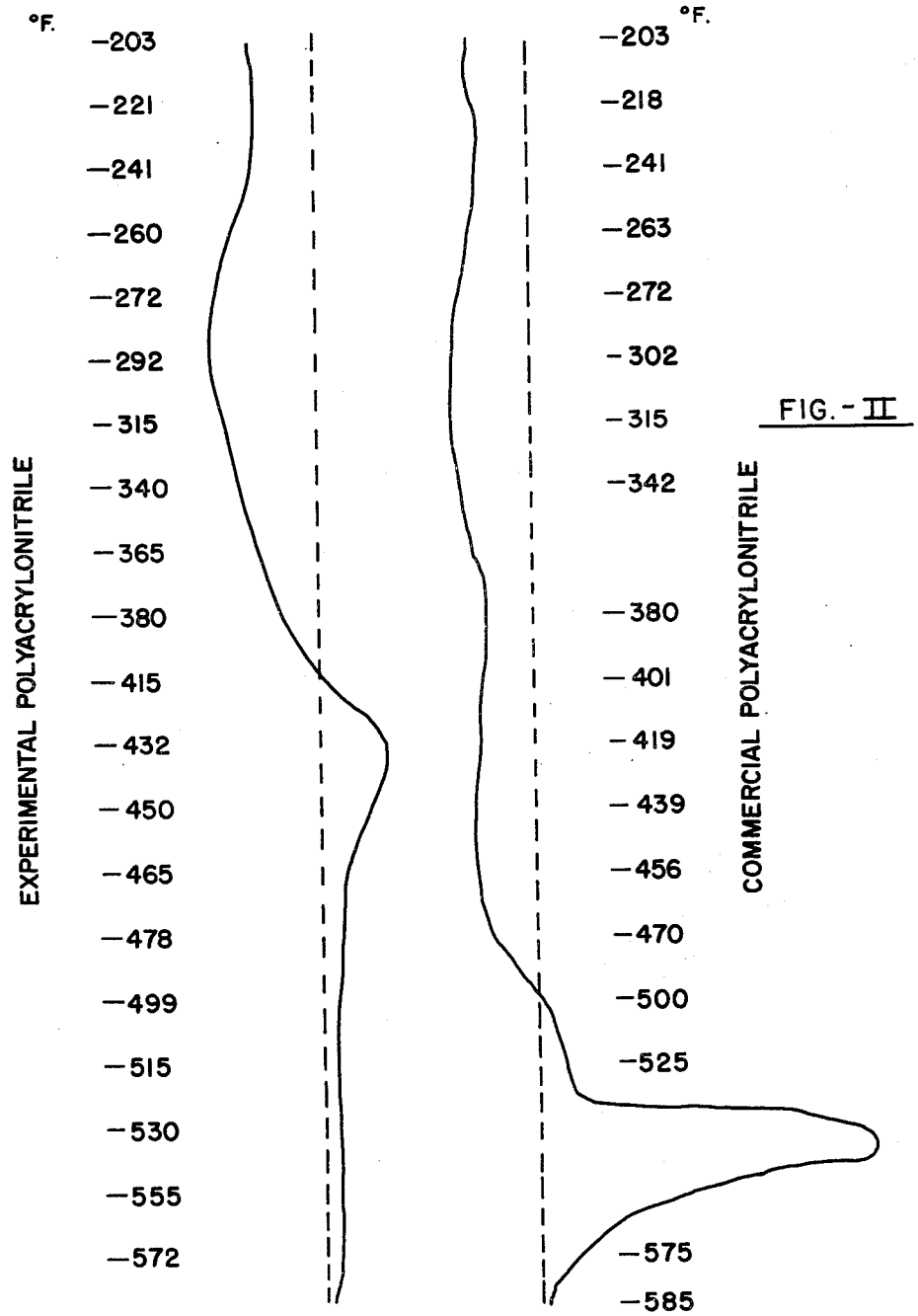

3,140,276
CONTINUOUS ELECTROLYTIC POLYMERIZATION PROCESS
Eric O. Forster, Scotch Plains, N.J., assignor to Esso Research and Engineering Company, a corporation of Delaware
Filed July 11, 1961, Ser. No. 123,155
5 Claims. (Cl. 260—88.7)

This invention relates to a novel continuous electrolytic process for the polymerization of various monomers to useful polymers. More particularly, it relates to a process of that nature in a nonaqueous medium whereby novel products are prepared.

It has now been found that certain monomers can be polymerized by a continuous electrolytic process which comprises applying an electric potential to two electrodes immersed in a nonaqueous, substituted hydrocarbon liquid dispersion of the monomer, in the presence of a minor amount of a quaternary ammonium halide, and recovering the polymer from the area of the cathodic electrode. Further details are elaborated upon below.

It is especially surprising that these features and the others that will be detailed operate in the manner that they do because products produced thereby are substantially different from those produced by varying them, e.g., by employing an aqueous medium or a nonhalogen ammonium salt.

The monomers employed correspond to the formula:

wherein Y is selected from the group consisting of hydrogen and lower alkyl radicals and Z is selected from the group consisting of hydrogen, alkyl, CN and halogen radicals. The alkyl substituents, where used, can be the same or different and preferably have from 1 to 6 carbon atoms. Typical examples of monomers employed in this invention are: acrylonitrile, $CNCH=CHCN$, $CH_3CH=CHCN$, $C_2H_5CH=CHCN$, etc. The electrolytic apparatus can be any conventional electrolytic cell, e.g., the "H" type cell, employing a source of D.C. voltage. The electrodes can be selected from any of the following metals: Pb, Au, Hg, W, Ti, Ni, Fe, Al, etc. and each electrode can be of a different metal. As employed herein, the term cathodic electrode refers to the one at which reduction takes place and the one to which cations migrate. The anodic compartment is that at which oxidation occurs.

The substituted, hydrocarbon liquid diluent employed requires a dielectric constant of 10 to 60 and preferably 25 to 50. Typical examples of liquids of this nature are: acetonitrile, dimethyl formamide, hexamethyl phosphoramide, dimethyl sulfoxide, pyridine and excess acrylonitrile itself.

A minor amount of a quaternary ammonium halide is also necessary. Typical examples of these materials are: $(CH_3)_4NCl$, $(C_2H_5)_4NCl$, and $(C_3H_7)_4NCl$. These quaternary compounds have the formula $R_4NX$ where R is an alkyl group having from 1 to 6 carbon atoms, and X is a halogen of Cl, Br or I. Thus, I or Br can be substituted for the Cl in the preceding compounds.

The monomer is employed in an amount of about 5 to 95 wt. percent or more based on the liquid diluent with a range of from 35 to 75% preferred and the quaternary ammonium halide in an amount of about 0.001 M to saturation based on the liquid diluent with a range of 0.001 M to 0.01 M preferred.

During the electrolysis, a potential difference of 2½ to 3½ volts, preferably 2.8 to 3.2, is maintained between the electrodes (as determined by the silver perchlorate standard reference electrode). The voltage is maintained relatively constant, i.e., a maximum fluctuation of about 0.1 to 0.2 volt by the use of a potentiostat (a device capable of maintaining a selected potential at a relatively constant level).

The polymer is finally recovered from the area of the cathodic electrode or cathode compartment.

The polyacrylonitriles prepared by this invention are also believed to be novel since they are predominantly a 1,4 polymer, i.e., at least 50%, with the rest 1,2 polymer. The polymers are all a strong yellow in color, probably due to the CN group in the molecular chain.

The polymeric products can be solids or liquids depending upon the molecular weight which can be in the range of $1 \times 10^3$ to $1 \times 10^6$ based on viscosity data. These products are halogen substituted to an extent of 0.1 to 0.8 weight percent because of the use of the quaternary ammonium halide. As detailed in the experiments, analytical data demonstrate the difference between these materials and polyacrylonitriles prepared by conventional processes. These characteristics of the products adapt them for fabricated articles such as hard fillers, fibers, and semi conductors.

The temperature employed in the polymerization is conveniently in the range of 0° to 30° C. at atmospheric pressures. The reaction time can vary from ½ to 10 hours. The product obtained at short time intervals in a quiescent environment is of high molecular weight, while stirring or prolonged reaction at room temperatures favor lower molecular weight products. The high molecular weight fraction (formed in the beginning) appears in the form of a yellow precipitate and settles at the bottom of the cell. As the reaction progresses less precipitate forms but the solution becomes more yellow and more viscous because of the lower molecular weight product formation. At the end the precipitate is filtered off and the lower molecular weight material precipitated with ether and then filtered and dried. The remaining filtrate then contains, in addition to ether, some unreacted monomer as well as some di, tri, and tetramers which can be recovered by evaporation or fractional distillation under vacuum and trapping the products at Dry Ice temperatures.

This invention will be better understood by reference to the following examples.

EXAMPLE I

Various electrolytes were employed in an electrolytic polymerization as claimed. The conditions and results are shown in the following table wherein acrylonitrile was employed as both monomer and diluent.

*Results of Various Polymerization Experiments*

[Solvent in all cases—commercial acrylonitrile]

| Run | A | B | C | D | E |
|---|---|---|---|---|---|
| Electrolyte | LiCl | KClO$_4$ | Me$_4$NCl | Et$_4$NBr | (n-prop)$_4$NClO$_4$ |
| Electrolyte Conc. Moles/liter | Sat | Sat | Sat | Sat | 0.01 |
| Duration of Exp., Hrs | 4 | 4 | 4 | 4 | 4 |
| Polymer found in Cathode Compartment[1] | no | no | yes | yes | no |
| Voltage Range, Volts | 20–80 | 20–80 | 20–80 | 20–80 | 20–80 |
| Current Range, Milliamps | 3.0–1.0 | 3.0–1.0 | 5.0–1.0 | 5.0–1.0 | 10.0–1.0 |

[1] Soluble in dimethylformamide and acetone.

The voltage range is that necessary to keep the cathodic electrode at the desired potential with respect to the reference electrode Ag, AgClO₄, acrylonitrile.

These data demonstrate the necessity of using a quaternary ammonium halide in the process of this invention.

The products from Runs C and D were analyzed and the results are tabulated below:

*Analysis of Polymer Samples*

| Weight Percent | Example C | Example D | Theory |
|---|---|---|---|
| N | 26.95 | 26.02 | 26.41 |
| H | 5.68 | 5.94 | 5.66 |
| C | 66.24 | 66.55 | 67.92 |
| Intrinsic Viscosity | 0.092 | 0.046 | |
| Molecular Weight | $1.3 \times 10^5$ | $8 \times 10^4$ | |

In both cases the X-ray diffraction pattern obtained indicated a more crystalline polymer as compared to the commercial type polymer obtained from emulsion polymerization which yields a relatively amorphous product.

EXPERIMENT II

Ultraviolet absorption spectra were determined for products of this invention and commercial polyacrylonitriles. Three characteristic wave lengths were employed.

| | Commercial | Experimental |
|---|---|---|
| 2,700 A | 0.105 | 0.510 |
| 3,050 A | 0.054 | 2.250 |
| 3,750 A | 0.017 | 1.180 |

These results demonstrate the marked difference between the patterns, which are due to the predominantly 1,4 structure of the experimental material of this invention.

EXPERIMENT III

Average specific conductances were determined for the products of this invention and comparable (in molecular weight) commercial polyacrylonitriles. The results were:

Conductance, 1% solutions in spectrograde dimethyl formamide
Experimental _____ $7.8 \times 10^{-5}$ mhos cm.⁻¹
Commercial _____ $1.44 \times 10^{-5}$ mhos cm.⁻¹
Blank, DMF _____ $1.7 \times 10^{-6}$ mhos cm.⁻¹

These results show a more than five-fold conductance for the products of this invention.

EXPERIMENT IV

Differential thermal analysis were carried out on high and low molecular weight polyacrylonitriles, both of this invention and commercial materials. FIG. 1 presents the data on the high molecular weight (about $1 \times 10^5$) material and FIG. 2 on the low molecular weight material (about $5 \times 10^3$). The graphs clearly demonstrate the differences between the two. The products of this invention did not cyclize or cross link.

The advantages of this invention will be apparent to those skilled in the art. A novel process for preparing novel products is provided. Products are made available which do not cyclize or cross link on heating.

It is to be understood that this invention is not limited to the specific examples which have been offered merely as illustrations and that modifications may be made without departing from the spirit thereof.

What is claimed is:

1. A process for the continuous electrolytic polymerization of a monomer corresponding to the formula:

wherein Y is hydrogen and Z is selected from the group consisting of hydrogen, alkyl radical having 1 to 6 carbon atoms, and CN radicals which comprises applying an electric potential to two electrodes immersed in a dispersion of said monomer in a liquid chosen from the group consisting of excess acrylonitrile, dimethyl formamide, hexamethyl phosphoramide, dimethyl sulfoxide and pyridine, said monomer being present in amounts of 5 to 95 wt. percent based on said liquid, said liquid having a dielectric constant of 10 to 60, in the presence of from .001 mole to saturation of a quaternary ammonium halide having the formula R₄NX where R is an alkyl group having from 1 to 6 carbon atoms and X is a halogen chosen from the group consisting of chlorine, bromine and iodine, the potential difference of the electrodes being in the range of 2.5 to 3.5 volts, maintaining this voltage relatively constant throughout the polymerization and recovering the polymer from the cathodic electrode.

2. The process of claim 1 in which the liquid has a dielectric constant of 25–50.

3. The process of claim 2 in which the potential difference is in the range of 2.8 to 3.2.

4. The process of claim 3 in which the monomer is acrylonitrile.

5. The process of claim 3 in which a temperature of 0–30° C. is employed.

References Cited in the file of this patent

UNITED STATES PATENTS

| 2,484,529 | Roedel | Oct. 11, 1949 |
| 2,726,204 | Park et al. | Dec. 6, 1955 |
| 2,961,384 | McKinney | Nov. 22, 1960 |